Nov. 9, 1948.  R. E. HARTLINE  2,453,318
RADIOACTIVITY LOGGING DEVICE
Filed Dec. 17, 1945

INVENTOR:
Ralph E. Hartline
BY
Attorney

Patented Nov. 9, 1948

2,453,318

UNITED STATES PATENT OFFICE 2,453,318

RADIOACTIVITY LOGGING DEVICE

Ralph E. Hartline, Tulsa, Okla., assignor to Stanolind Oil and Gas Company, Tulsa, Okla., a corporation of Delaware Application December 17, 1945, Serial No. 635,595

5 Claims. (Cl. 250—83.6)

This invention relates to the measurement of extremely minute electrical currents or voltages and is directed particularly to devices for measuring such electrical quantities at inaccessible locations such as in the logging of wells and the like.

It has long been known that the performance of electrometer circuits is greatly influenced by the humidity of the atmosphere in which they are situated. Although the electrical disturbances encountered in such circuits are usually considered due to surface leakage across insulators as a result of water vapor adhering thereto, in circuits developed for measuring such small currents as ionization chamber currents in radio-activity well logging I have observed an additional disturbing effect of moisture. It appears that the surface moisture film extending from one metallic conductor across an insulating surface to another conductor acts not only as a leakage path but also as an electrolytic cell generating an electromotive force. As long as the metallic conductors are connected by resistances of $10^8$ ohms or less, the effect of this stray E. M. F. is not appreciable due either to the equivalent cell having a much higher internal resistance or to its becoming rapidly polarized and rendered ineffectual by current flow. However, in electrometer circuits for radioactivity well logging instruments the circuit elements may have resistances of from $10^9$ to $10^{13}$ ohms, in which case these stray E. M. F.'s not only persist but may be many times greater than the quantity to be measured.

In ordinary electrometer circuits for laboratory and similar uses it is sufficient to enclose the parts where high insulating properties must be maintained in a fairly air-tight container in which is placed a quantity of drying chemical such as $CaCl_2$. In the instruments used for radioactivity well logging, however, this simple expedient cannot be applied for several reasons. In these instruments the electrometer compartment often contains batteries, electrolytic condensers, gaskets, fabrics, and like materials which may contain water either as such or as occluded moisture. Temperature variations such as heating in the sun or in a warm well bore followed by cooling cause a redistribution of moisture from these sources which often renders the instrument completely inoperative or at the very least greatly reduces its effectiveness.

Further, the mechanical shock and vibrations to which well logging instruments are subjected in handling and in transportation from place to place, as well as during use in a well bore, cause exposed powdered drying chemicals to sift through the electrometer compartment. Particles settling on important insulator surfaces thereafter draw the moisture to and collect it on these surfaces, absolutely defeating the purpose intended in introducing the drying chemical and further increasing the generation of stray potentials mentioned above.

While it might be thought that the drying chemical could be confined behind dust filtering materials, the rapidity with which moisture conditions change inside a well logging instrument due to temperature changes rules out this possibility. It is found that the access of moisture-laden air to the chemical is much too greatly restricted by such filters, and far too much time is required to reduce even a small moisture content to the necessary minimum. The time for drying by a confined chemical is even further extended for well logging instruments due to the fact that the compartment to be dried is ordinarily elongated in form so that natural circulation of the air by diffusion or convection is very slow.

The practice heretofore adopted for well logging instruments accordingly has been to seal all batteries in vacuum-tight containers, open the electrometer compartment only in a specially air-conditioned room where the moisture content has been reduced to a very low value, and evacuate the electrometer compartment, refilling it with a dry, inert gas. Even these elaborate precautions are partially nullified by the subsequent alternate heating and cooling with resultant moisture redistribution previously described.

It is therefore a primary object of my invention to provide a novel and improved means for dehydrating the electrometer compartment of a system for measuring minute currents, particularly one used for well logging. Another object is to provide a dehydrating apparatus of this type which is of simple construction and operation, requiring no especial skill or care in its use and no precautions about exclusion of moisture when the compartment is opened for adjustments or servicing. A further object is to provide a hydrating apparatus capable of reducing the moisture content of the atmosphere in a well logging electrometer compartment to a very low value in only a short period of operation. A still further object is to include as an integral part of the current measuring apparatus a dehydrating apparatus of this type adapted to be used either just prior to or during the running of the logging instrument in a well. Other and further objects, uses, and advantages of the invention will become apparent as the description thereof proceeds.

These objects are accomplished in accordance with my invention by a compact drying system built directly into and forming an integral part of the measuring electrometer compartment. The inlet and outlet of the system are specifically arranged with reference to the parts to be dried and the possible sources of moisture, and so as to insure circulation of the dried atmosphere throughout the entire critical section of the elongated structure. The drying chemical is confined behind dust filters, but rapid access of the moisture-containing air thereto is assured by forced circulation using a suitable circulating pump. In fact, the time required to reduce the moisture content of the compartment air to a satisfactorily low value is even less using forced circulation over the confined chemical than using an exposed chemical and relying on natural circulation as by diffusion and convection.

The principles and operation of my invention will be more clearly understood by reference to the accompanying drawings forming a part of this application for purposes of illustration. In these drawings, in which the same reference numeral in different figures refers to the same or a corresponding part, Figure 1 is a cross section of a well logging instrument showing an embodiment of the invention therein;

Figure 1:
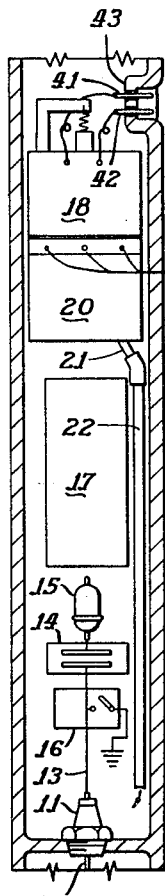

Referring now to Figure 1, I have there shown in section the electrometer compartment of a typical well logging instrument 10 to which the invention is applicable. Within this compartment there may be an insulator 11 supporting an ionization chamber electrode 12 which is connected by a conductor 13 to a coupling condenser 14, the other terminal of which is connected to the grid of an electrometer tube 15. Between lead 13 and ground is a switch 16 operated by clockwork or other constant speed mechanism for periodically grounding lead 13 at uniformly spaced intervals. Batteries and associated circuits for the operation of electrometer tube 15 are included in the unit 17, the various circuit elements and connecting leads being omitted from this figure to avoid complicating the illustration.

Figure 2:
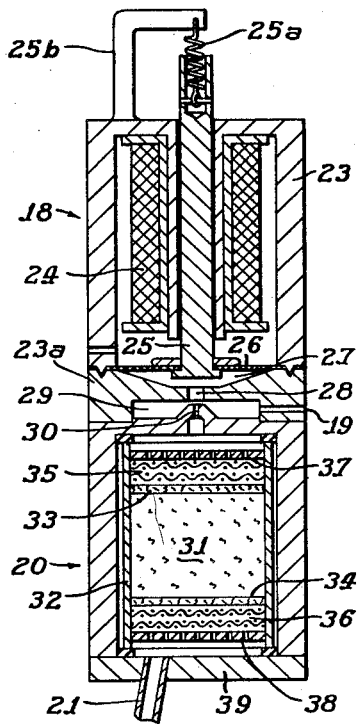
Figure 2 is a detailed cross section of a combined pump and drying chemical unit used in the embodiment of Figure 1.

Also within this compartment of instrument 10 are an electrically operated pump 18 having inlet ports 19 and, directly attached thereto, a drying chemical chamber 20 with outlet 21 connected to a distributing tube or conduit 22. As is shown in more detail in Figure 2, pump 18 comprises a housing 23 of ferromagnetic material which encloses a coil 24 surrounding a central plunger rod 25 also of ferromagnetic material. Fastened to one end of plunger 25 is a flexible diaphragm 26 which cooperates with the ferromagnetic end member 23a of housing 23 in forming a chamber 27 having a single jet opening 28 leading to a space 29. To the opposite end of plunger 25 is attached a tension spring 25a which is suspended from an extension arm 25b or similar support fixed to housing 23. The inlet openings 19 admit air from outside the housing into this space 29. Directly opposite jet opening 28 is an upstanding collector tube 30 communicating with drying chamber 20.

Within chamber 20 is a body of drying chemical 31 such as calcium chloride surrounded by a cylindrical can or container 32 and confined between felt discs 33 and 34, which are supported by screening 35 and 36 and perforated plates 37 and 38 forming the ends of can 32. Chamber 20 is closed by end plate 39 having the outlet pipe 21 fixed therein. As is believed apparent, can 32 and its end closures constitute a cartridge which can be replaced simply by removing plate 39, withdrawing the cartridge, and inserting a new one filled with fresh chemical.

Pump 18 is operated by intermittently applying voltage to coil 24, plunger 25 being drawn downward toward member 23a during periods when the current is on and upwardly by spring 25a when the current is off. This reciprocating action alternately draws air into and expels it quickly from space 27. On the intake stroke air is drawn from all parts of space 29 to opening 28, but on the exhaust stroke the air issues from opening 28 in a blast or jet of which a large portion enters collector tube 30. Thus without any valves or rotating parts and by using a simple reciprocating mechanism, a considerable current of air can be drawn in through inlets 19 and passed through tube 30 into chemical 31 where it is dried.

As shown in Figure 1, this dried air is conducted by tube 22 to a point in the compartment where the efficiency of the insulators must be maintained at the highest possible level; namely, near the circuit elements at the input of electrometer tube 15. By placing inlets 19 of the circulating pump at the other end of the compartment, any moisture issuing from unit 17 or any other element will be picked up and carried to the drying chemical before it diffuses as far as the input leads to tube 15.

While it would be a simple matter to operate pump 18 continuously during the making of a log by providing a battery and interrupter within instrument 10, it has been found sufficient in actual practice to carry out a single thorough drying operation a short time before running the instrument into a well. Accordingly the ends of coil 24 are brought out to insulated prongs 41 and 42 set in a recess 43 in the wall of instrument 10. To operate the pump it is then necessary only to connect to prongs 41 and 42 a plug 44, to which power is supplied by an external battery 45 in series with an interrupter 46.

Figure 3:
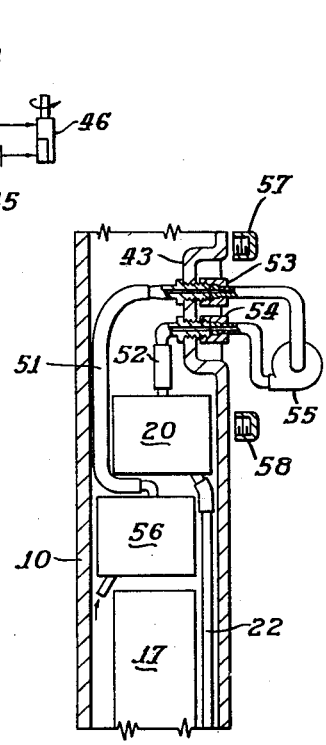
Figure 3 is a cross section of a logging instrument showing a modification of the invention applied thereto.

By thus using an enclosed circulating system the sealing of the electrometer compartment against the entrance of well fluids constitutes no problem. However, it may be considered preferable in some cases to make use of a modification like that of Figure 3 having an external circulating pump. Thus, an inlet conduit 51 and an outlet conduit 52 are brought out through the wall of instrument 10 at the recess 43 and provided with threads for connection to tubing couplings 53 and 54 on tubes or conduits leading respectively to the suction and discharge of a pump 55. Inside instrument 10 drying chemical chambers 20 and 56 are connected to the outlet and inlet conduits 52 and 51, so that upon operation of pump 55 air is drawn first through drier 56 and after passing through the pump is forced back into the electrometer compartment through drier 20 and distributed by tube 22. At the end of the drying operation the pump leads are removed by disconnecting couplings 53 and 54, and caps 57 and 58 are screwed in place to seal the ends of conduits 51 and 52. Although only one drier 20 or 56 would be required to remove the moisture from the chamber atmosphere, by employing two in the manner described the accidental entrance of moisture or moist air in connecting or disconnecting the pumping leads is prevented.

Figure 4:
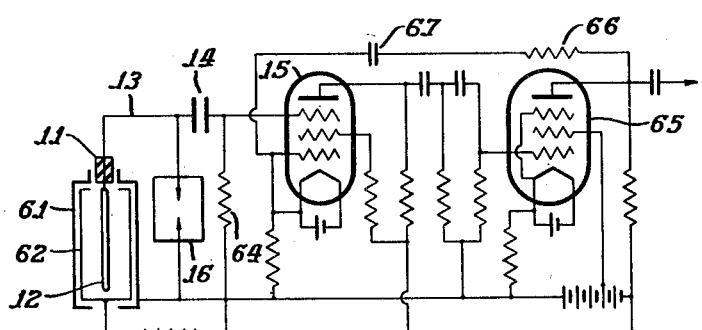
Figure 4 is a wiring diagram of an electrometer circuit showing parts where high insulating properties are needed.

For a better understanding of the circumstances wherein my invention is most useful, I have shown in Figure 4 a diagram of a typical circuit employed for radioactivity logging. The ionization chamber detector consists of the grounded outer casing 61, the insulated outer electrode 62, and the inner collector electrode 12 supported by the insulator 11. The potential of a battery 63 is applied between casing 61 and electrode 62. By the insulated lead 13 collector electrode 12 is connected to the coupling condenser 14, which couples it to the suppressor grid of the electrometer tube 15 here used as the control grid to which the signal is applied. This connection is found to afford a sufficiently high input resistance to work satisfactorily with the input resistor 64 connected between the suppressor grid and ground even though the value of resistor 64 may run as high as $10^{11}$ ohms.

The grid ordinarily used as the control grid of tube 15 is here tied directly to the cathode. The remaining parts of the amplifier circuit are quite conventional, the output of tube 15 being applied through a resistance-capacity coupling to the grid of amplifier tube 65. For stabilizing the performance and extending the frequency range of the system a degenerative or negative feedback from the output of tube 65 is applied to the cathode of tube 15 through the resistance 66 and capacity 67.

Between lead 13 and ground is inserted the switch 16, which serves two functions simultaneously in periodically grounding this lead and electrode 12. When switch 16 closes, the potential difference between electrodes 12 and 62 is brought back up to the full potential of battery 63, and the coupling condenser 14 is simultaneously discharged through resistance 64. Thus while switch 16 is open, the potential difference between electrodes 12 and 62 is decreased slightly by the ionization current in the compressed gas in the space between them, and a corresponding charge is built up on condenser 14, which therefore acts as an accumulator or integrator. However, as the amplifier is responsive only to alternating potential or to quick changes in a D. C. potential, it is not affected by this slow charging of condenser 14. On the other hand, it readily amplifies the sudden pulse of voltage across resistance 64 when switch 16 closes. As the magnitude of this pulse is approximately proportional to the total ionization over the interval of time while the switch is open, a signal is thus provided which is much larger and more easily amplified than the instantaneous value of the ionization current.

It will be apparent that the size of resistor 64 is one of the chief determinants of the efficiency required of the various insulators. In other words, the parallel leakage resistance across insulator 11 to ground, across switch 16 when it is open, across the insulators supporting the plates of condenser 14, across the terminals of resistor 64, and around the lead to the normal suppressor grid of tube 15 must be maintained large compared to the value of resistor 64; in other words, larger than $10^{11}$ ohms. This is a fairly stringent requirement, but is one that is met with little difficulty by the drying system of the present invention, particularly when the dried air is first passed over the critical circuit elements enumerated. Keeping these surfaces perfectly dry also holds down the generation of stray electromotive forces to a point where they do not cause trouble.

While I have described my invention in terms of the foregoing specific embodiments, it is apparent that a number of modifications will readily occur to those skilled in the art. It should therefore be understood that the invention is not limited to the exact details of the embodiments described but is to be defined by the scope of the following claims.

I claim:

1. In well-logging apparatus sealed against the entrance of external moisture, including means in an elongated chamber for measuring minute electrical currents, said means including at least one high resistance insulator and at least one internal source of moisture, the combination of a conduit extending through a substantial length of said chamber, a drying chemical wholly enclosed within said chamber and confined by dust-filtering materials, and means for forcing the atmosphere in said chamber through said chemical and said conduit in series, said atmosphere being withdrawn from near said moisture source and being released near said high resistance insulator.

2. In well-logging apparatus, the combination comprising an ionization chamber, an elongated, sealed electrometer compartment, an electrometer having circuit components occupying said compartment and connected to said ionization chamber for amplifying its output, certain of said components requiring extremely high insulation efficiency and others of said components being capable of releasing moisture, a drying chemical, a container for said chemical, and dust filtering materials for confining said chemical within said container, said chemical and said container being wholly enclosed within said compartment, a conduit extending through a substantial length of said compartment and coupled to said container, and an air-circulating pump, said pump, conduit, and container being connected in series with intake near said moisture-releasing components and with outlet near said components requiring high insulation efficiency.

3. In well logging apparatus including an elongated electrometer compartment containing electrical current measuring means, some of which may release moisture, the combination of a quantity of drying chemical confined by a porous filtering medium, an electrically operated pump for forcing the atmosphere in said compartment over said chemical, and electrical connector means set in the wall of said compartment whereby power from a source external to said compartment may be supplied to said pump without unsealing said compartment.

4. In well-logging apparatus including an elongated, sealed electrometer compartment containing means for measuring minute electrical currents, some of said means requiring high insulation and others of said means constituting sources of moisture, the combination wholly enclosed within said compartment comprising: a quantity of drying chemical confined by a porous filtering medium, an electrically operated pump for forcing the atmosphere of said compartment over said chemical, a conduit extending through an appreciable length of said compartment and connected in series with said pump and said drying chemical, the atmosphere of said compartment being withdrawn at a point near said moisture sources and returned near said means requiring high insulation, and electrical connector means sealed in and extending through an exterior wall of said compartment and connected to said pump for supplying electric power thereto from an external source.

5. In well logging apparatus including an elongated electrometer compartment containing electrical current measuring means, some of which may release moisture, the combination of a pair of conduits each in series with a quantity of drying chemical confined by a porous filter medium, one end of each of said conduits being near one of the two ends of said compartment and the other ends of said conduits passing through the wall of said compartment to the outside thereof, means for coupling said other ends respectively to the inlet and the outlet of an air circulating pump, and means for sealing said conduit ends against the entrance of well fluids when said coupling means are removed.

RALPH E. HARTLINE.

REFERENCES CITED

The following references are of record in the file of this patent:

UNITED STATES PATENTS

| Number | Name | Date |
|---|---|---|
| 233,492 | Field | Oct. 19, 1880 |
| 1,866,611 | Affel | July 12, 1932 |
| 2,275,747 | Fearon | Mar. 10, 1942 |
| 2,359,959 | Anderson | Oct. 10, 1944 |